(12) United States Patent
Yang et al.

(10) Patent No.: US 10,554,078 B2
(45) Date of Patent: Feb. 4, 2020

(54) METHOD AND APPARATUS FOR COIL INTEGRATION FOR UNIFORM WIRELESS CHARGING

(71) Applicant: INTEL CORPORATION, Santa Clara, CA (US)

(72) Inventors: Songnan Yang, San Jose, CA (US); Janardhan Koratikere Narayan, Fremont, CA (US); Ntsanderh C. Azenui, Santa Clara, CA (US); Ahmad Khoshnevis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 14/864,452

(22) Filed: Sep. 24, 2015

(65) Prior Publication Data
US 2016/0380480 A1 Dec. 29, 2016

Related U.S. Application Data

(60) Provisional application No. 62/152,755, filed on Apr. 24, 2015.

(51) Int. Cl.
*H02J 50/12* (2016.01)
*H02J 7/02* (2016.01)
*H02J 50/70* (2016.01)

(52) U.S. Cl.
CPC ............ *H02J 50/12* (2016.02); *H02J 7/025* (2013.01); *H02J 50/70* (2016.02)

(58) Field of Classification Search
CPC .................................................. H02J 50/70
See application file for complete search history.

(56) References Cited

U.S. PATENT DOCUMENTS

| 9,472,338 B2 | 10/2016 | Keeling et al. | |
|---|---|---|---|
| 2002/0158306 A1* | 10/2002 | Niitsu | G06F 17/5063 257/531 |
| 2008/0030292 A1 | 2/2008 | Kubono et al. | |
| 2009/0015362 A1 | 1/2009 | Okada et al. | |
| 2012/0057322 A1* | 3/2012 | Waffenschmidt | H01F 27/365 361/816 |

(Continued)

FOREIGN PATENT DOCUMENTS

| CN | 1361550 A | 7/2002 |
|---|---|---|
| CN | 101110526 A | 1/2008 |

(Continued)

OTHER PUBLICATIONS

Office Action received for Chinese Patent Application No. 201610154038.3, dated Jul. 19, 2017, 7 pages.

(Continued)

*Primary Examiner* — Jared Fureman
*Assistant Examiner* — Joel Barnett
(74) *Attorney, Agent, or Firm* — Spectrum IP Law Group LLC

(57) ABSTRACT

The disclosure relates to a method, apparatus and system to wirelessly charge a device. Specifically, the disclosed embodiments provide improved charging stations for increased active charging area. In one embodiment, the disclosure relates to an offset device for use with a Power Receiving Unit (PRU). The offset device includes a conductive layer supporting an aperture, the aperture aligned with an inner most coil loop of the PRU; and a first slot formed in the conductive layer extending from the aperture to an outside edge of the conductive layer.

19 Claims, 17 Drawing Sheets

(a)

(b)

(56) References Cited

U.S. PATENT DOCUMENTS

| | | | |
|---|---|---|---|
| 2012/0276854 A1* | 11/2012 | Joshi | A61N 1/37229 455/73 |
| 2012/0306714 A1 | 12/2012 | Yosui et al. | |
| 2013/0181668 A1* | 7/2013 | Tabata | H01F 38/14 320/108 |
| 2013/0300360 A1* | 11/2013 | Kobayashi | H01F 38/14 320/108 |
| 2013/0307746 A1 | 11/2013 | Nakano et al. | |
| 2015/0076922 A1* | 3/2015 | Kato | H04W 4/80 307/104 |
| 2016/0141099 A1* | 5/2016 | Maekawa | H01F 38/14 307/104 |

FOREIGN PATENT DOCUMENTS

| | | |
|---|---|---|
| CN | 101345327 A | 1/2009 |
| CN | 102428622 A | 4/2012 |
| CN | 3368125 | 5/2019 |
| EP | 1928003 A2 | 6/2008 |
| JP | 2014011533 A | 1/2014 |
| JP | 2014075775 A | 4/2014 |
| KR | 20120099131 A | 9/2012 |
| KR | 20130129843 A | 11/2013 |

OTHER PUBLICATIONS

Xiao Lu et al., Wireless Charger Networking for Mobile Devices: Fundamentals, Standards, and Applications, arXiv:1410.8635v2 [cs.NI], Dec. 9, 2014, 16 pages.

Office Action received Chinese Patent Application No. 201610154038.3 dated Aug. 20, 2018, 5 pages.

Notice of Allowance received for Korean Patent Application No. 2016-0034617 dated Aug. 28, 2018, 3 pages including 1 page of English translation.

* cited by examiner

METHOD AND APPARATUS FOR COIL INTEGRATION FOR UNIFORM WIRELESS CHARGING

The application claims the benefit of the filing date of Application Ser. No. 62/152,755, filed Apr. 24, 2015, the disclosure of which is incorporated herein in its entirety.

BACKGROUND

Field

The disclosure relates to a method, apparatus and system to wirelessly charge a device. Specifically, the disclosed embodiments provide improved receiver coil integration technique to improve coupling uniformity between receiver and charging stations for increased position flexibility.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category e devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging implementation is particularly challenging for devices with large chassis size such as tablets and laptops. There is a need for improved wireless charging systems to extend position flexibility and to improve coupling and charging uniformity.

BRIEF DESCRIPTION OF THE DRAWINGS

These and other embodiments of the disclosure will be discussed with reference to the following exemplary and non-limiting illustrations, in which like elements are numbered similarly, and where:

FIG. 6(a) schematically illustrates Eddy current distribution of an exemplary embodiment when the PRU and PTU are fully overlapped;

DETAILED DESCRIPTION

Position flexibility and multi-device charging are differentiating features of A4WP based wireless charging system. Coupling uniformity between the PRU and PTU is critical in achieving both features. For small devices (e.g., wearables/smart phones) where the PRU resonators is close to the size of the entire device, uniform coupling may be achieved by creating a PTU resonator that offers uniform magnetic field in the charging area.

Figure 1:
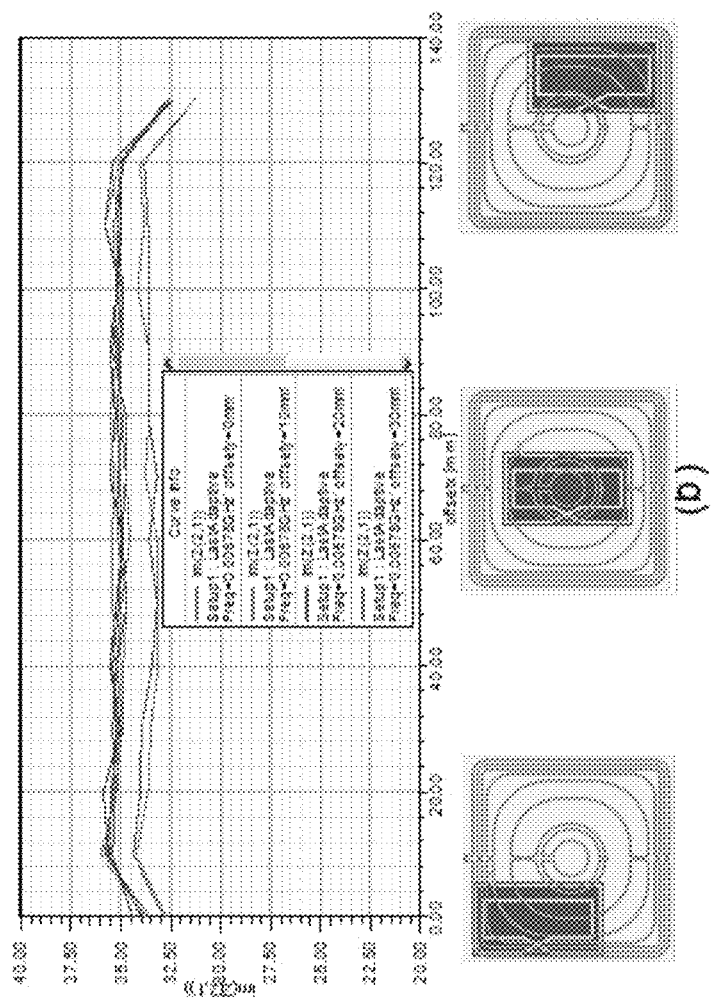
FIG. 1(a) shows a conventional coil with uniform Magnetic field.
FIG. 1(b) shows coupling variation at different relative position between receiver coil and conventional coil of FIG. 1(a)
Figure 1:
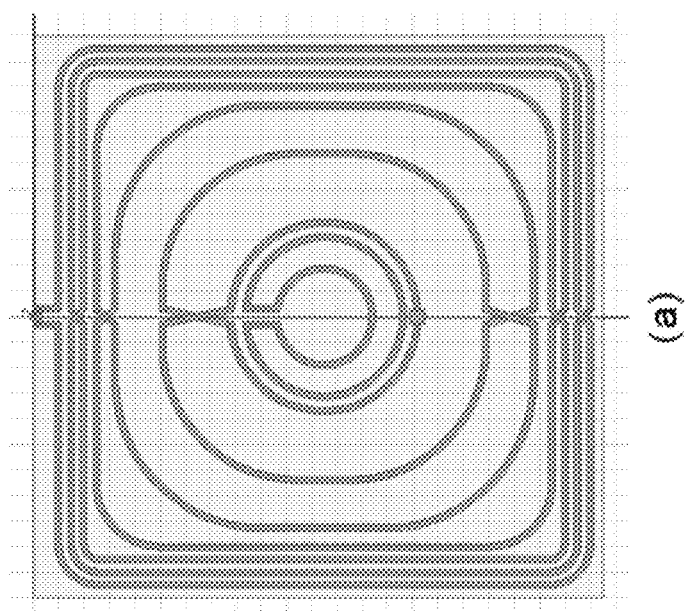

However, for large devices such as tablets and notebooks, the PRU coil only covers a portion of the device. The device chassis and metallic components inside the device modulate the coupling between the PTU and PRU coil. As a result, magnetic coupling varies significantly depending on the relative positions (i.e., overlap) of the PTU and PRU. This holds true even when the PTU coil provides a substantially uniform magnetic field. FIG. 1(a) shows a PTU coil design that offers a substantially uniform magnetic field within the coil area. When a receiver coil scans through the surface of the PTU coil, the coupling is uniform as shown in FIG. 1(b). It should be noted that throughout the disclosure coupling is measured in mutual impedance, Z21.

Figure 2:
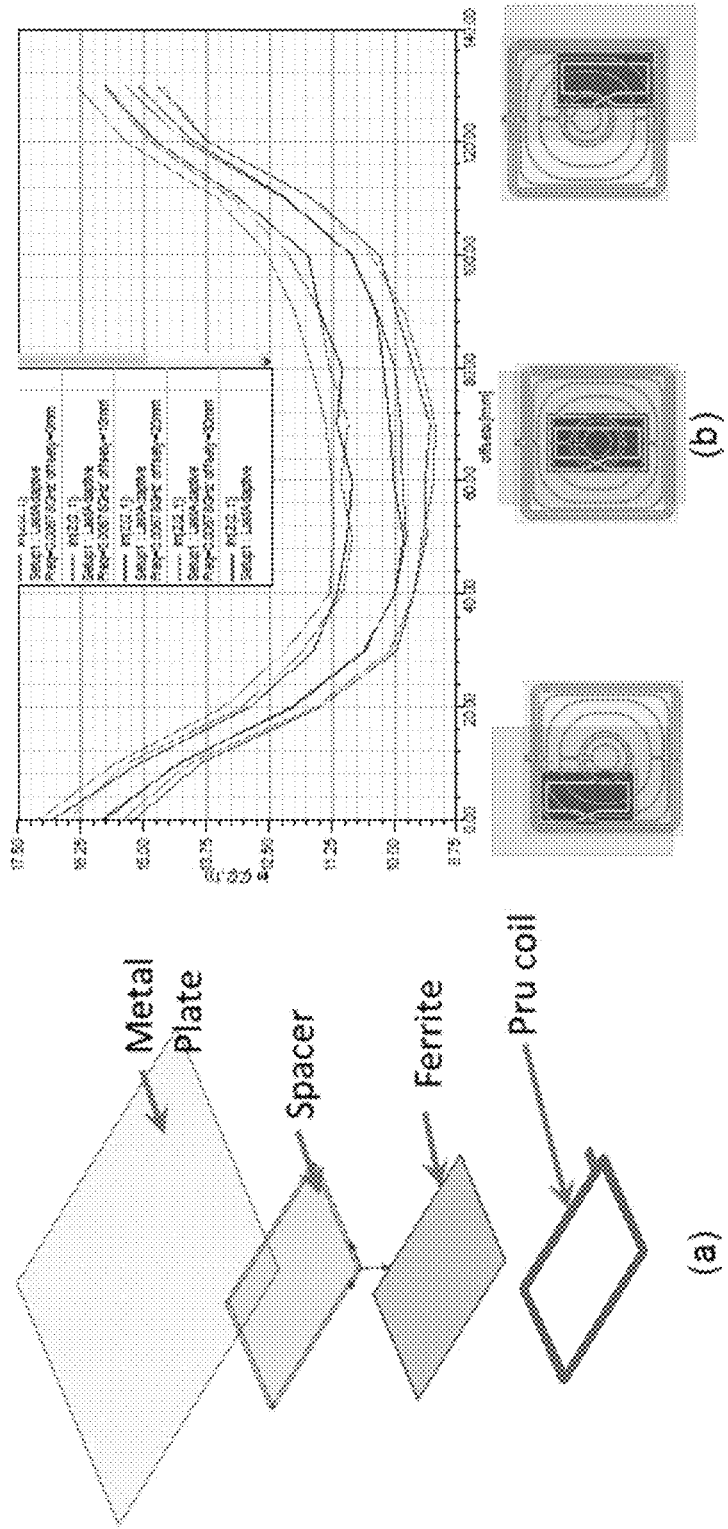
FIG. 2(a) schematically illustrates a resonator interoperability tester (RIT) assembly with metal plate backing.
FIG. 2(b) illustrates coupling variation caused by the relative position of RIT and a PTU having a substantially uniform magnetic field.

FIG. 2(a) shows a conventional Resonator Interoperability Tester (RIT) for tablet integration of PRU. The RIT of FIG. 2(a) consists of coil, ferrite and solid piece of metal emulating a metal chassis as used in conventional tablet devices (e.g., iPad). As the RIT is moved across the active area of the uniform-field PTU, the coupling varies dramatically depending on the overlap between the PTU and PRU resonators. This relationship is shown in FIG. 2(b). As shown in FIG. 2(b), the mutual impedance reaches its maximum point when the RIT partially overlaps the PTU coil. The mutual impedance reaches a minimum point as the metal plate aligns with the center of the PTU coil and fully covers the entire active area (the middle figure). The uneven coupling causes significant challenge in certification of PTU design and PRU integration solutions for interoperability. Applicants have discovered that the large coupling variation is caused by the Eddy currents generated on the metal plate (see FIG. 2(a)) which occurs in reaction to the magnetic field applied to the PRU.

Figure 3:
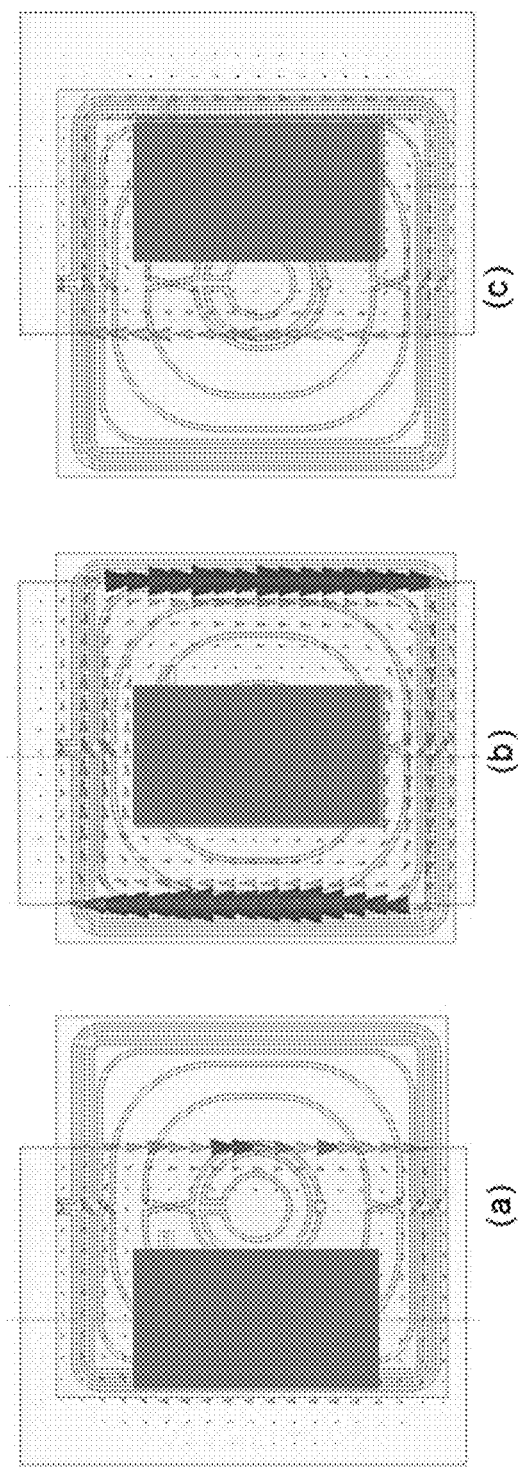
FIG. 3(a) schematically illustrates Eddy currents on a metal plate when the PRU is positioned to the left of the PTU's center.
FIG. 3(b) schematically illustrates Eddy currents on a metal plate when the PRU is positioned to the center of the PTU.
FIG. 3(c) schematically illustrates Eddy currents on a metal plate when the PRU is positioned to the right of the PTU's center.

As shown in FIGS. 3(a) and 3(c), when the RIT/PRU partially overlaps the PTU coil, the generated Eddy current is small and does not impact the PRU/PTU coupling. When the PTU and RIT/PRU fully overlap, as shown in FIG. 3(b), strong Eddy current is generated along the edges of the metal plate of the RIT around the PRU coil. The strong Eddy currents cancel a significant portion of magnetic field generated by the PTU and lead to significant coupling deterioration.

An embodiment of the disclosure overcomes this and other deficiencies of the conventional wireless coil integration systems. In an exemplary embodiment, the disclosure provides an integrated solution for one or more PRU designs that efficiently convert a substantially uniform magnetic field generated by PTU to a substantially uniform coupling with PRU. The disclosed embodiments are effective even when there is a large conductive plate present behind the PRU coil such as those found in larger computing devices. In another embodiment, the disclosure provides a unique coil integration method and apparatus to overcome the conventional PRU and/or PTU deficiencies.

An embodiment of the disclosure is directed to introducing one or more additional components to the PRU/RIT to improve coupling efficiency regardless of the relative positioning of the PRU in relation to the PTU. The disclosed implementations provide a coupling profile that compensates the coupling variation introduced by the large continuous metal plate in the PRU/RIT such that the combined effect is a substantially uniform coupling.

Figure 4:
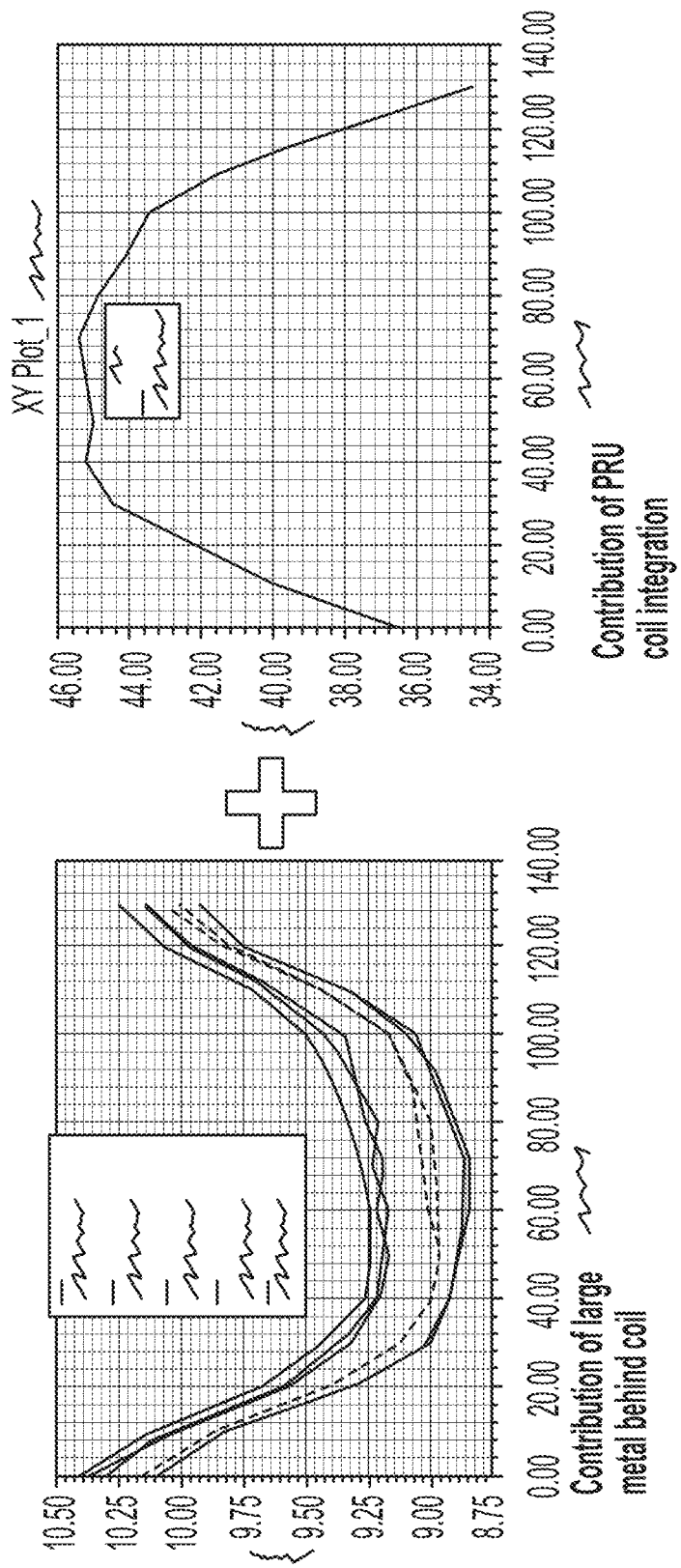
FIG. 4 graphically illustrates the results from implementing an embodiment of the disclosure.
Figure 4:
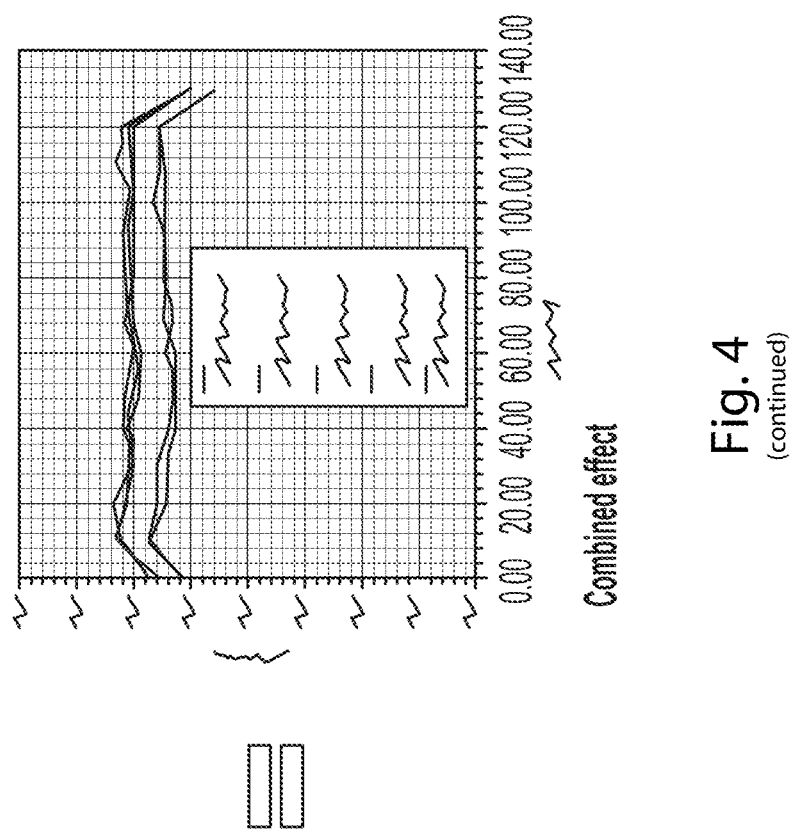

FIG. 4 graphically illustrates the results from implementing an embodiment of the disclosure. In FIG. 4 the adverse contributions (i.e., Eddy currents) of a large metal surface or chassis of the computing device are offset by contributions of PRU coil integration to result in efficient and uniform coupling.

Figure 5:
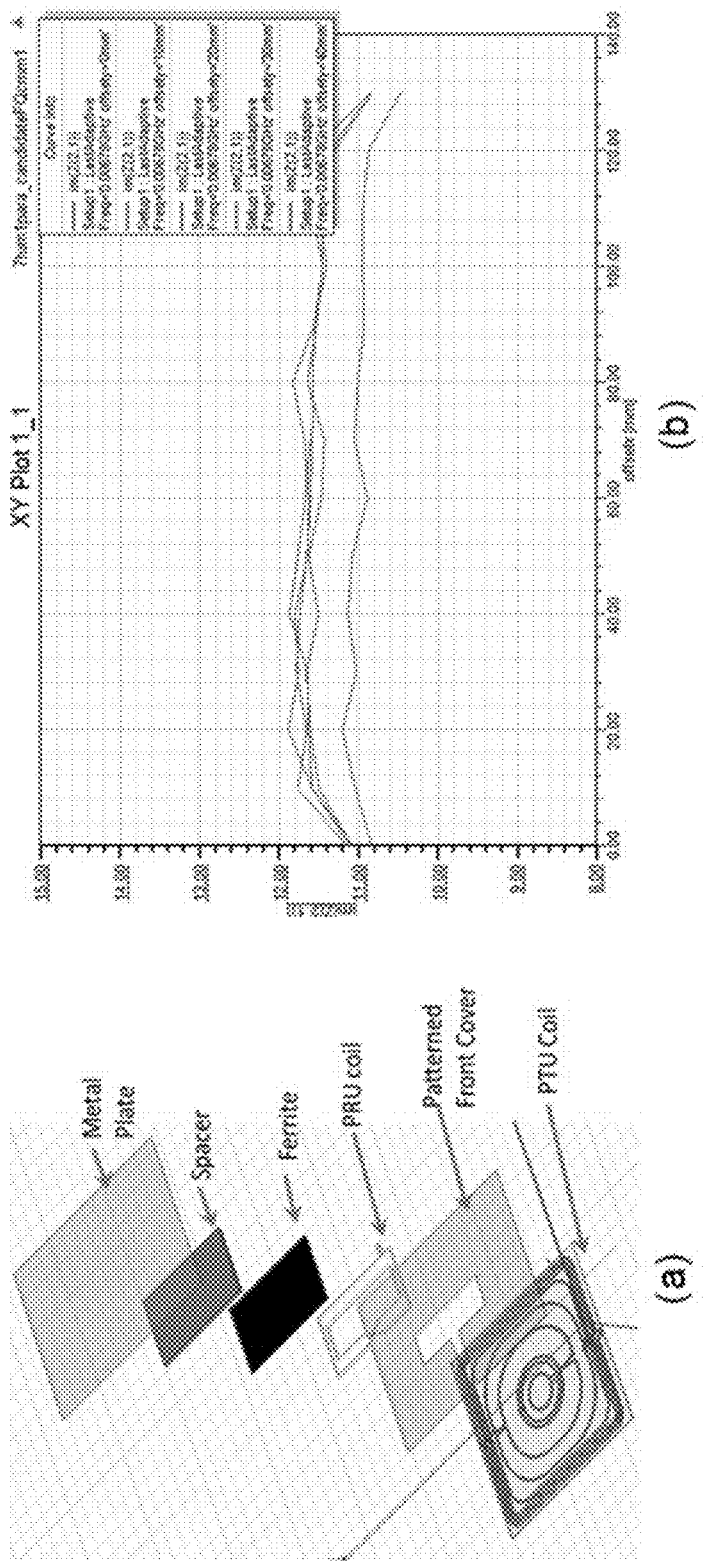
FIG. 5(a) schematically illustrates an exemplary embodiment of the disclosure.
FIG. 5(b) illustrates measured variation of coupling between the PTU and the modified PRU as shown in the embodiment of FIG. 5(a)
FIG. 5(c) illustrates a bottom view of the patterned added conductive layer and its relative position to the receiver coil.

FIG. 5(a) shows an exemplary apparatus according to one embodiment of the disclosure. In particular, FIG. 5(a) shows a patterned conductive layer added in between the PTU and PRU coil as part of the PRU coil. The added conductive layer (e.g., patterned front cover) may be positioned in front of the PRU coil. In some embodiment, the conductive layer is substantially similar in size and shape as the device itself. The patterned conductive layer may optionally include a strategic pattern thereon. The pattern may be configured to modify and redirect the Eddy currents and compensate for the coupling variations cause by the metal plate (or device itself) which may be positioned behind the PRU coil. FIG. 5(b) shows test results indicating that the coupling variation is significantly reduced when a properly designed conductive layer is added according to the disclosed embodiments. In an alternative embodiment, a conductive layer may be void of pattern.

In certain embodiments, the disclosure is directed to positioning a conductive layer to address or to offset the generated Eddy currents. In one embodiment, the conductive layer comprises metal or metal alloys. In another embodiment, the conductive layer or material may include semiconductive material or non-metallic material. As used herein, the term conductive metal layer (interchangeably, conductive layer) is used generically and may include metallic and non-metallic as well as both conductive and semiconductive material. The conductive layer may be patterned. In one implementation, the conductive layer may be positioned in front of the PRU coil (e.g., between PTU and PRU coil) so as to boost coupling when the PRU/RIT is at maximum overlap while having no effect when the PTU and PRU coils partially overlap.

Figure 5C:
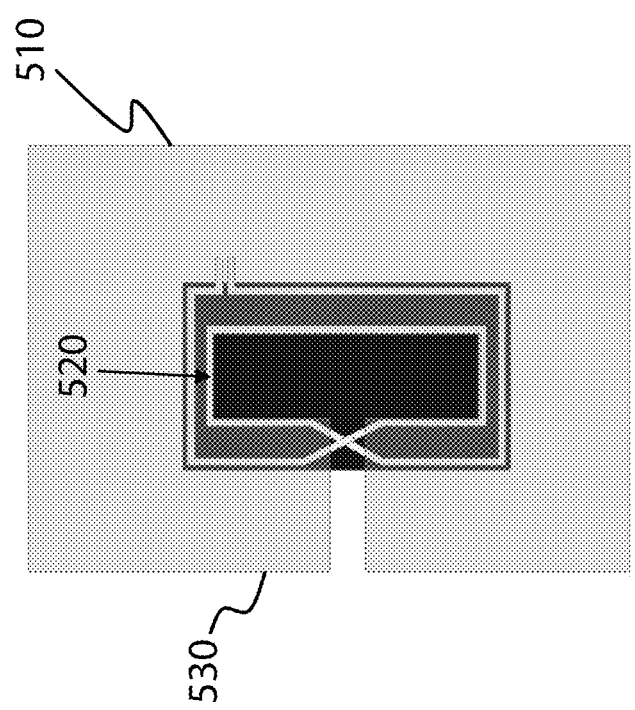

As stated, certain embodiments of the disclosure relate to the design and configuration of the conductive layer. In one implementation, the design of the patterned conductive layer starts by introducing an opening (or an aperture) on the layer along the inner most turn of the PRU coil. Thereafter, a slot may be formed along the centerline to the edge of the conductive layer. An exemplary embodiment is shown in FIG. 5(c) where patterned conductive layer 510 includes opening 520 and slot 530.

Figure 6:
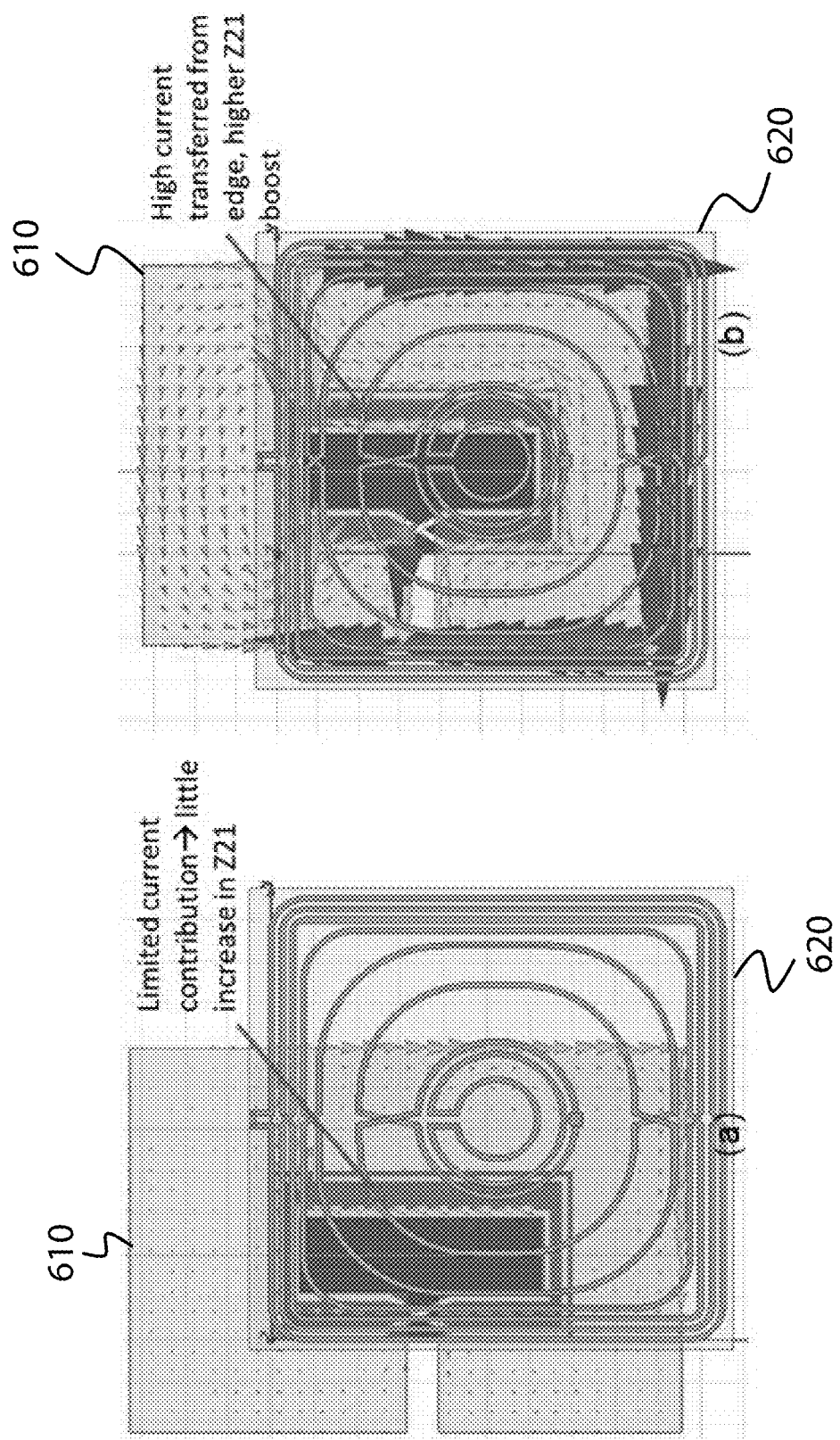
FIG. 6(a) schematically illustrates Eddy current distribution of an exemplary embodiment when the PRU and PTU have a partial overlap.

FIG. 6(a) shows a partial overlap and FIG. 6(b) shows a full overlap between the PRU/RIT 610 and PTU 620. PRU/RIT 610 is represented, by way of example, including a conductive layer having an opening and a slot thereon. FIG. 6(a) shows limited current contribution and small increase in mutual impedance (Z21). FIG. 6(b) shows high current transferred from edges of the device and higher mutual inductance (Z21) boost as indicated by clockwise arrows.

As shown in FIG. 6(a), when PRU/RIT 610 partially overlaps PTU coil 620 (which is generating substantially uniform magnetic field perpendicular to its surface) the Eddy currents on the conductive layer run clockwise along the outskirt of the conductive layer then take a turn at the slot and flow counter clockwise around the coil opening.

The counter clockwise current can enhance the field generated by PTU and results in a higher coupling with PRU coil 610. When the overlap between PTU 620 and PRU 610 is maximum (as shown in FIG. 6(b)), the Eddy current is much stronger. As a result, the in-phase Eddy current near the opening is also stronger thereby giving the coupling a much higher boost.

FIG. 7(a) shows an embodiment of the disclosure where the conductive layer is configured with an asymmetrically positioned slot. The PRU/RIT 410 partially overlaps PTU coil 720 with the slot inside the active area of coil 720. The induced Eddy currents near the coil opening on the conductive layer are out of phase with the PTU field. As a result, the coupling is slightly reduced as shown in FIG. 7(b). The three illustrations in FIG. 7(b) are smaller thumbnails of FIG. 6(a) shown as 750, FIG. 6(b) shown as 752 and FIG. 7(a) shown as 754. FIG. 7(b) illustrates that when the slot is asymmetric, the coupling compensation is monotonic which is non-ideal. Consequently, more slots may be advantageous as will be illustrated and discussed in the figures that follow.

FIGS. 8(a)-8(c) show embodiments of the disclosure where the conductive layer is configured with symmetrically positioned slots. Each of FIGS. 8(a)-8(c), shows different positional offsets for PRU 810 and PTU 820. The symmetrically positioned slots of PRU 810 extend outwardly from the center of the PRU. PTU 820 is shown at various positions in FIGS. 8(a) (offset to the right), FIG. 8(b) (offset to center) and FIG. 8(c) (offset to the left). The symmetrically-positioned slots ensure any generated Eddy current is in phase with the PTU field when the PRU with proposed design scans through the uniform PTU field horizontally.

The coupling variation between the PTU and PRU are shown in FIG. 8(d) where the disclosed embodiment exhibits uniform coupling along different horizontal offsets shown in FIGS. 8(a)-8(c). The different lines shown in FIG. 8(d) show coupling at different vertical offset levels with suboptimal variation. Additional modification of the conductive layer configuration may be made to render uniform coupling along the vertical offset conditions.

Figure 9:
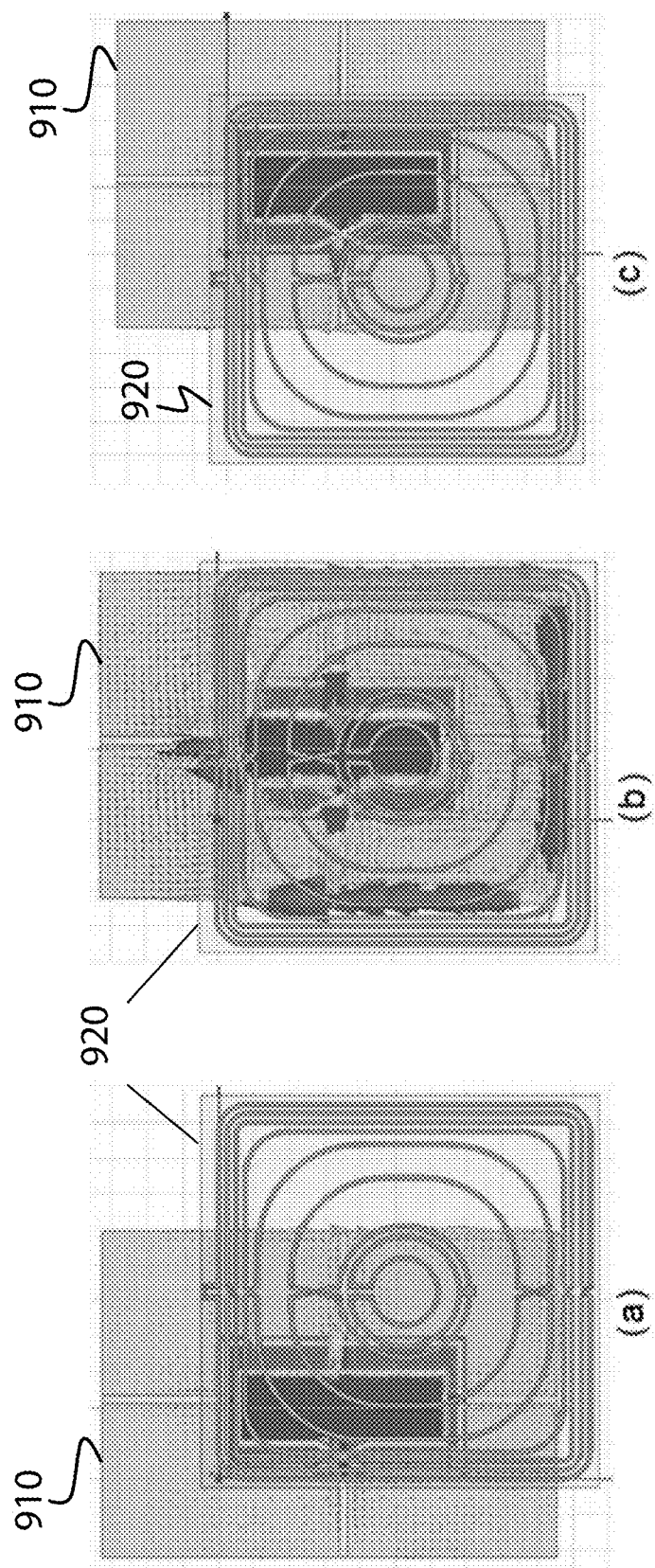
FIG. 9(a) shows the Eddy current distribution for an embodiment having 4 slots and positioned at the left of the PTU's center.
FIG. 9(b) shows the Eddy current distribution for an embodiment having 4 slots and positioned at the center of the PTU.
FIG. 9(c) shows the Eddy current distribution for an embodiment having 4 slots and positioned to the right of the PTU's center.

FIGS. 9(a)-9(c) show embodiments of the disclosure where additional vertical cuts are formed on the conductive layer. Specifically, two additional vertical cuts are made to the added conductive layer 910 of FIG. 9 such that the cuts are offset by an approximate 90 degree angle. Even with more slots formed on the added conductive layer, the fundamental behavior of the added conductive layer did not change. Namely, currents along the coil opening remained in phase with the applied field regardless of the relative positions of PRU 910 and PTU 920. It can be seen in FIG. 9(b) that the Eddy current runs clockwise along the edge of the PRU 910 and is offset so as to not disturb magnetic coupling uniformity between PRU 910 and PTU 920.

Figure 10:
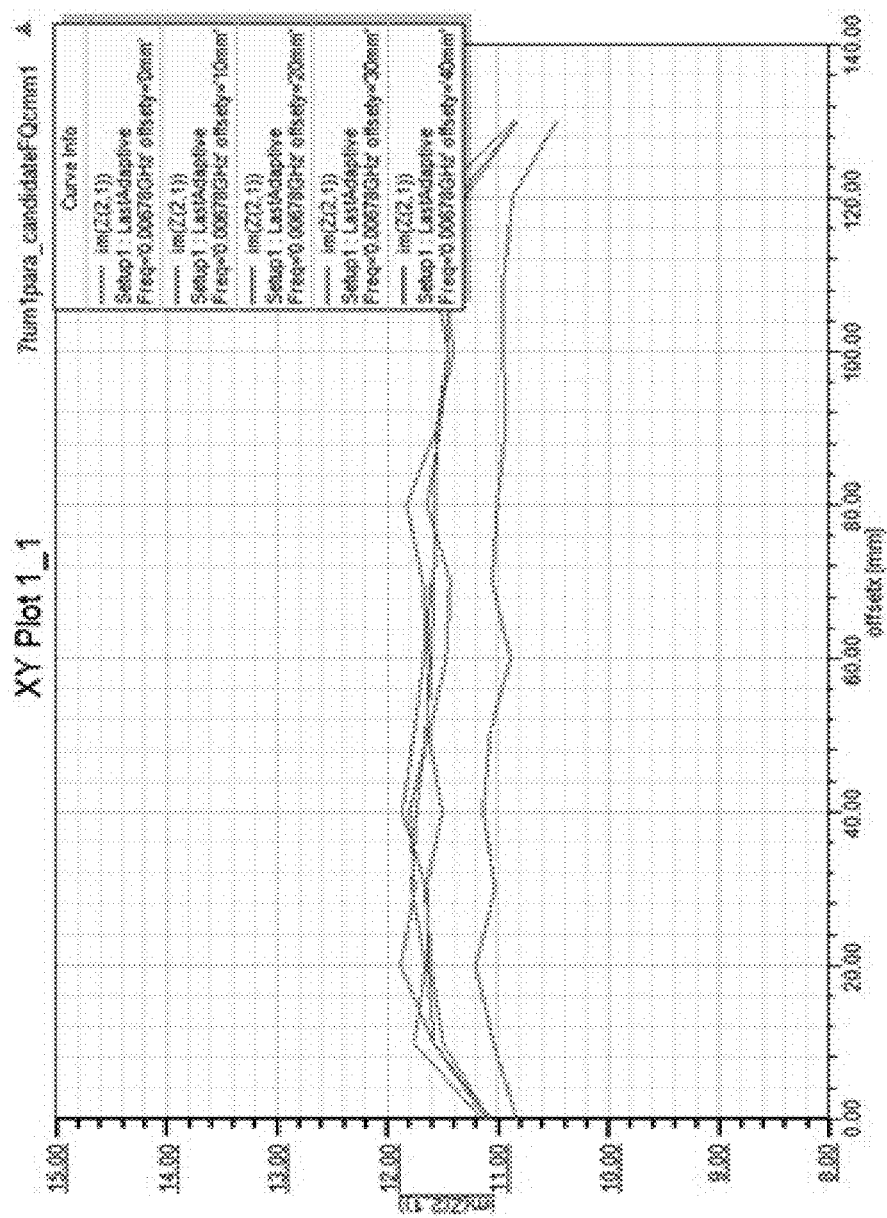
FIG. 10 illustrates the measured coupling variations for the device having conductive layer with 4 slots as shown in overlapping positions of FIGS. 9(a)-9(c)

FIG. 10 shows coupling variations for different overlap conditions as shown in FIG. 9(a)-9(c). Here, substantially uniform coupling is achieved when the disclosed PRU embodiment is presented to the PTU coil with uniform field with various horizontal and vertical relative positions. It should be noted that FIGS. 9 are 3 illustrate special cases covered by Z21 plots of FIG. 10.

Each one of the implementations between FIGS. 6 through 9 may be applied to certain design configuration to reduce the coupling variation introduced by the PRU device. Other modifications and/or permutations may be made without departing from the disclosed principles. The characteristics of each unique system may be studied and evaluated prior to configuring an efficient conductive layer design for the desired application. By way of example, prototypes were made and integrated with a tablet device to demonstrate advantages of the disclosed embodiments.

Figure 7:
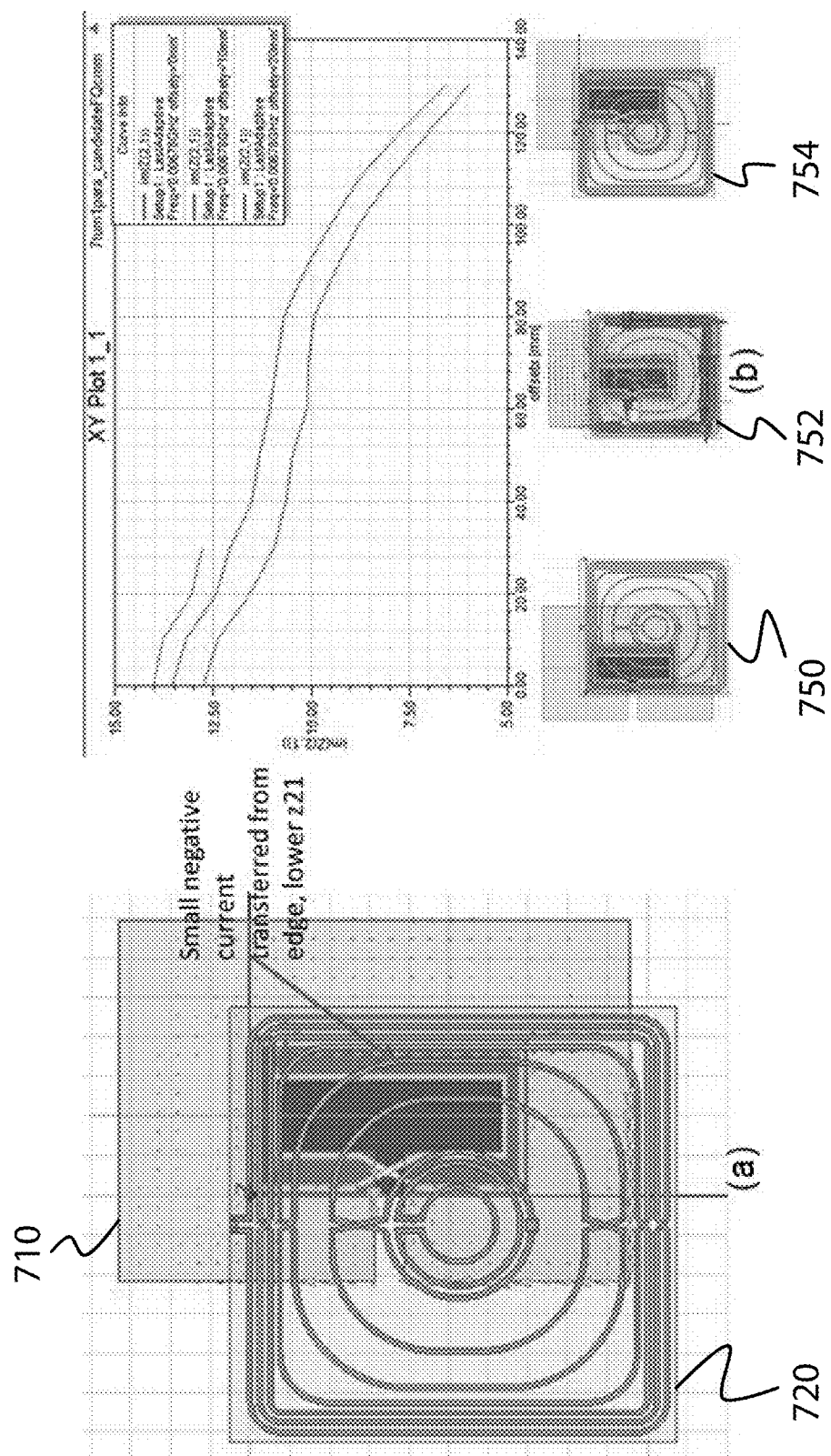
FIG. 7(a) schematically illustrates Eddy current on proposed conductive layer for partial overlap (with slot)
FIG. 7(b) illustrates coupling variation as the an exemplary embodiment is positioned at different locations across the PTU.
Figure 11:
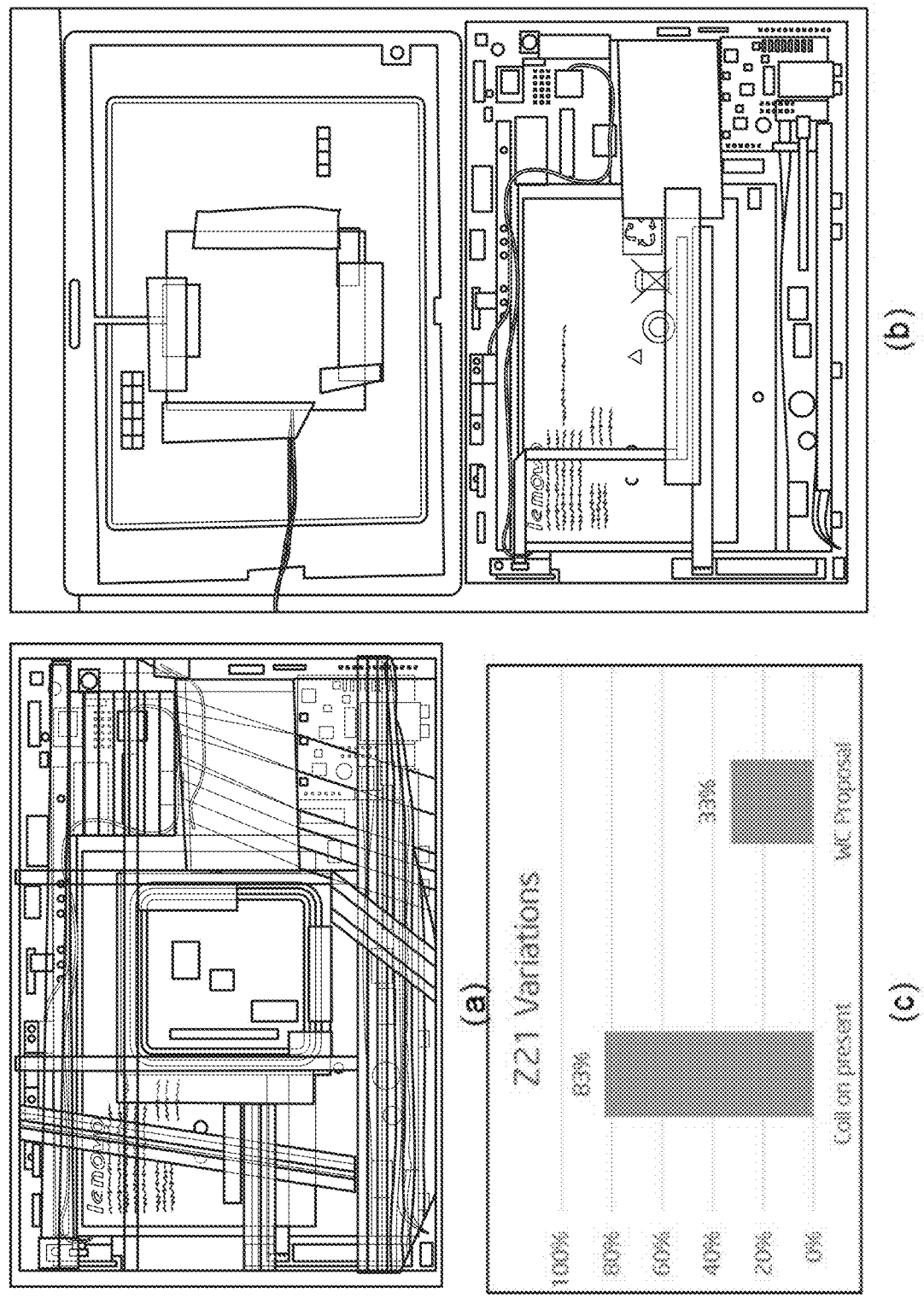
FIG. 11(a) shows a conventional PRU integrated with a conventional tablet computing device.
FIG. 11(b) shows an embodiment of the disclosure integrated with a conventional tablet computing device.
FIG. 11(c) illustrates the measured coupling variation between the implementations of FIGS. 11(a) and 11(b)

FIG. 11 shows an exemplary implementation of the embodiment described in relation to FIG. 7. In FIG. 11 two integration methods of PRU coil were prototyped: one had a coil directly applied to the tablet without including a patterned conductive layer (FIG. 11(a)) while the other had a patterned conductive layer with an opening and one slot (FIG. 11(b)). The coupling variation (through mutual inductance, Z21) was measured and presented in FIG. 11(c). In both cases the PRU was exposed to a substantially uniform magnetic field generated by the PTU. As shown in FIG. 11(c), about 50% improvement in coupling uniformity was achieved by adding a patterned conductive layer in accordance with the disclosed embodiments.

Figure 8:
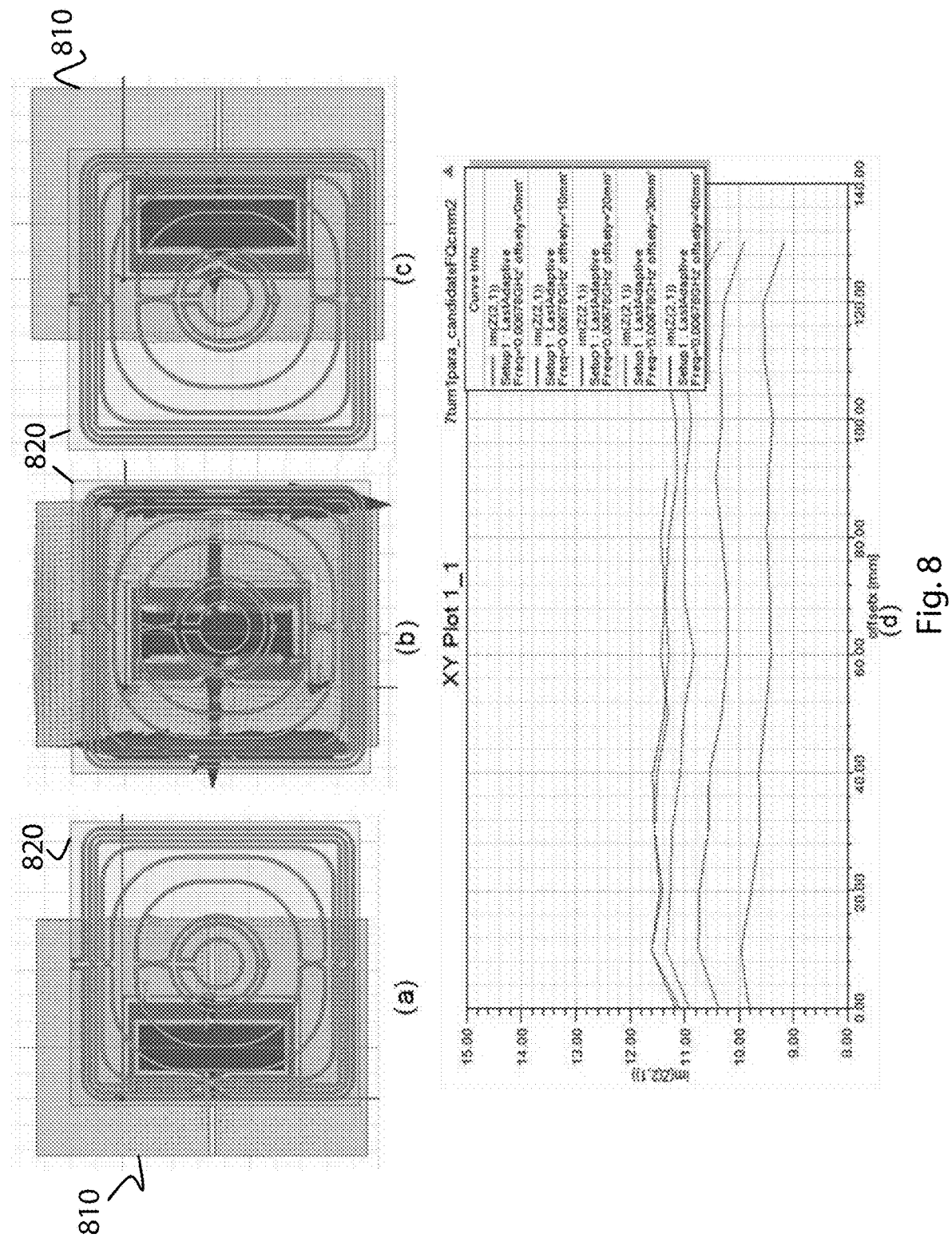
FIG. 8(a) illustrates Eddy current distribution when an exemplary PRU is positioned to the left of the PTU's center.
FIG. 8(b) illustrates Eddy current distribution when an exemplary PRU is positioned at the center of the PTU.
FIG. 8(c) illustrates Eddy current distribution when an exemplary PRU is positioned to the right of the PTU's center.
FIG. 8(d) illustrates the measured coupling variations across the horizontal and vertical offsets as shown in FIGS. 8(a)-8(c)
Figure 12:
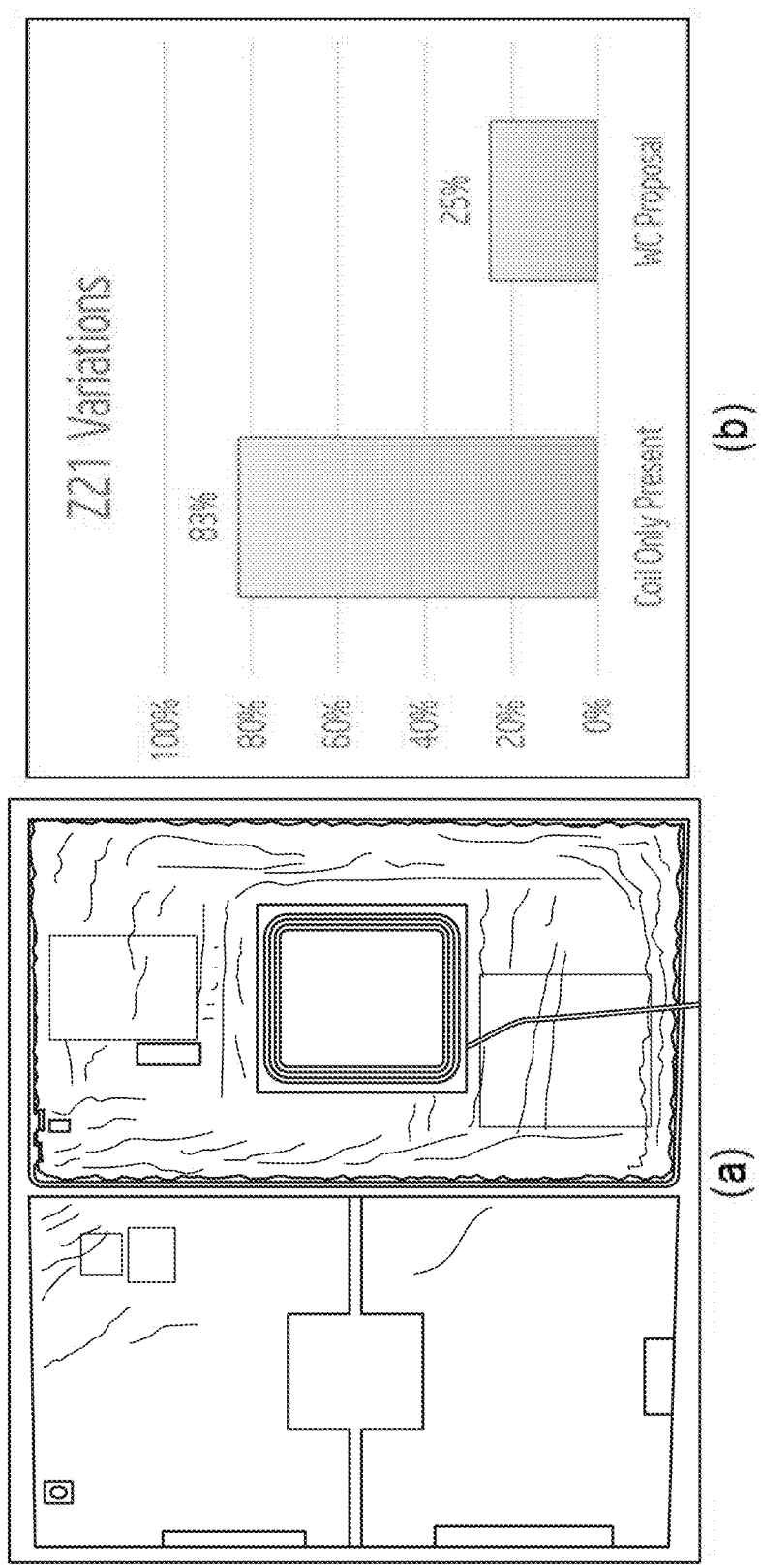
FIG. 12(a) shows a conductive layer having two slots integrated with a PRU device according to one embodiment of the disclosure.
FIG. 12(b) illustrates the measured coupling variation of the device of FIG. 12(a) as compared to a conventional device.

FIG. 12 shows an exemplary implementation of the embodiment described in relation to FIG. 8. In FIG. 12, a copper shield was added to the tablet of FIG. 11 and a two-slot conductive layer was placed in front of the PRU coil. As compared with the conventional tablet, integrating the patterned conductive layer increased coupling uniformity by nearly 60%.

Figure 13:
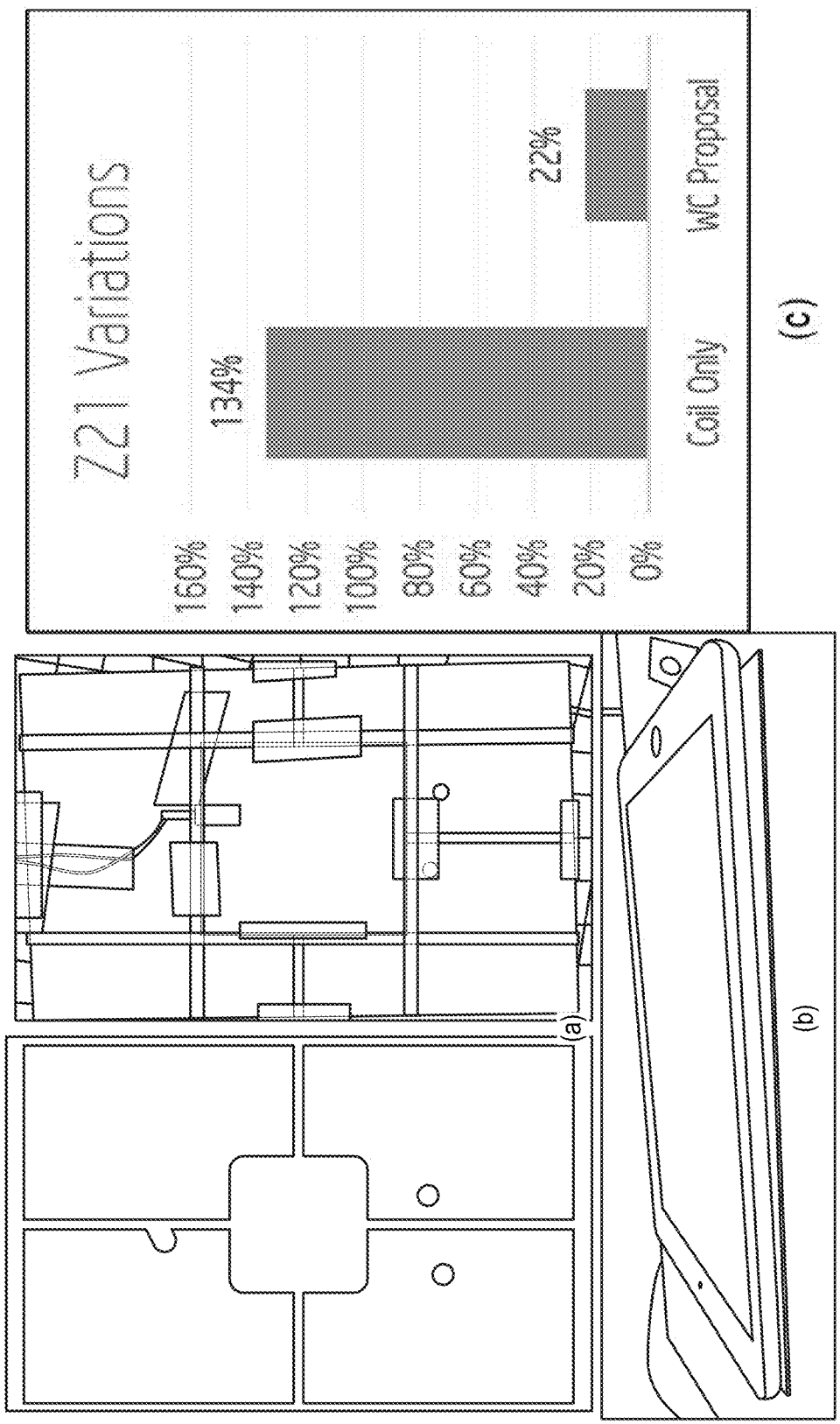
FIG. 13(a) shows the front and back view of a conductive layer having four slots and arrangement of ferrite and coil according to one embodiment of the disclosure.
FIG. 13(b) shows a test configuration including an iPad and the conductive layer of FIG. 13(a)
FIG. 13(c) illustrates the measured coupling variation of the device of FIG. 13(b) as compared to the conventional device.

FIG. 13 shows an exemplary implementation of the embodiment described in relation to FIG. 9. Specifically, a 10 inch iPad was used to demonstrate the improvements when using the embodiment discussed in relation to FIG. 9. The test configuration is shown in FIG. 13(a) where 4 slots and a coil opening were created on the conductive layer which was then placed in front of the PRU coil. An iPad is placed on top of the assembly during the coupling measurements. The measured coupling variation is shown in FIG. 13(c). As seen in FIG. 13(c), a 110% improvement in coupling uniformity is achieved with the proposed solution as compare to conventional implementation (i.e., implementation of FIG. 2).

Alternative implementations and embodiments of the disclosure include conductive layers which may be patterned to accommodate device geometry and Eddy currents. The following include additional non-limiting and exemplary embodiments of the disclosure.

Additional cuts and/or asymmetric cuts which may be added to the proposed patterned conductive layer to achieve further coupling uniformity.

The added patterned conductive layer which may be grounded or otherwise mechanically/electrically coupled to the metal plate behind the PRU coil at one or more strategic locations to achieve good ESD and EMI performance. For example, in the case of 4 slot case (FIG. 9), the connection between the two conductive layers can be made at 4 corners without impacting the coupling uniformity.

Figure 14:
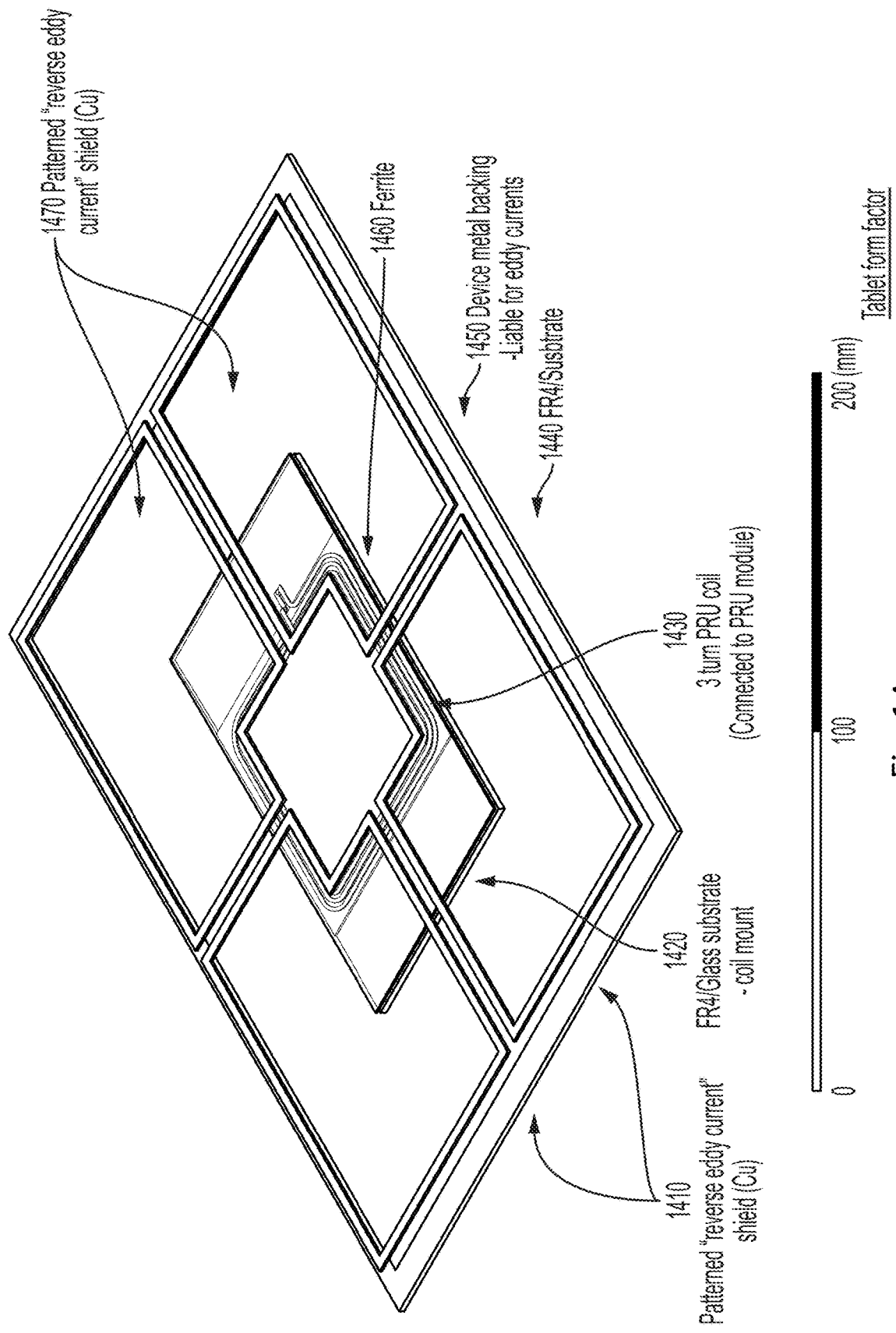
FIG. 14 illustrates an alternative implementation of the disclosure.

The added patterned conductive layer may not comprise solid conductive area/islands. In order to capture the flux generated by the PTU coil and carry the proper Eddy current, conductive strips may cover the outline of the conductive area/islands may sufficiently achieve the desired result. An exemplary embodiment of this configuration is shown in FIG. 14, where instead of solid conductive area, only the outline of the conductive area is used to form a conductive frame. The embodiment of FIG. 14 provides an economical, low-loss, patterned shield for PRU with extended metal backing. Specifically, FIG. 14 shows a patterned shield having substrate 1440, device metal backing 1450 (liable for eddy currents), ferrite 1460, patterned 'reverse eddy current' shield (Cu) 1470, 3-turn PRU coil 1430, FR4/glass substrate coil 1420 and patterned 'reverse eddy current' shield (Cu) 1410.

Figure 15:
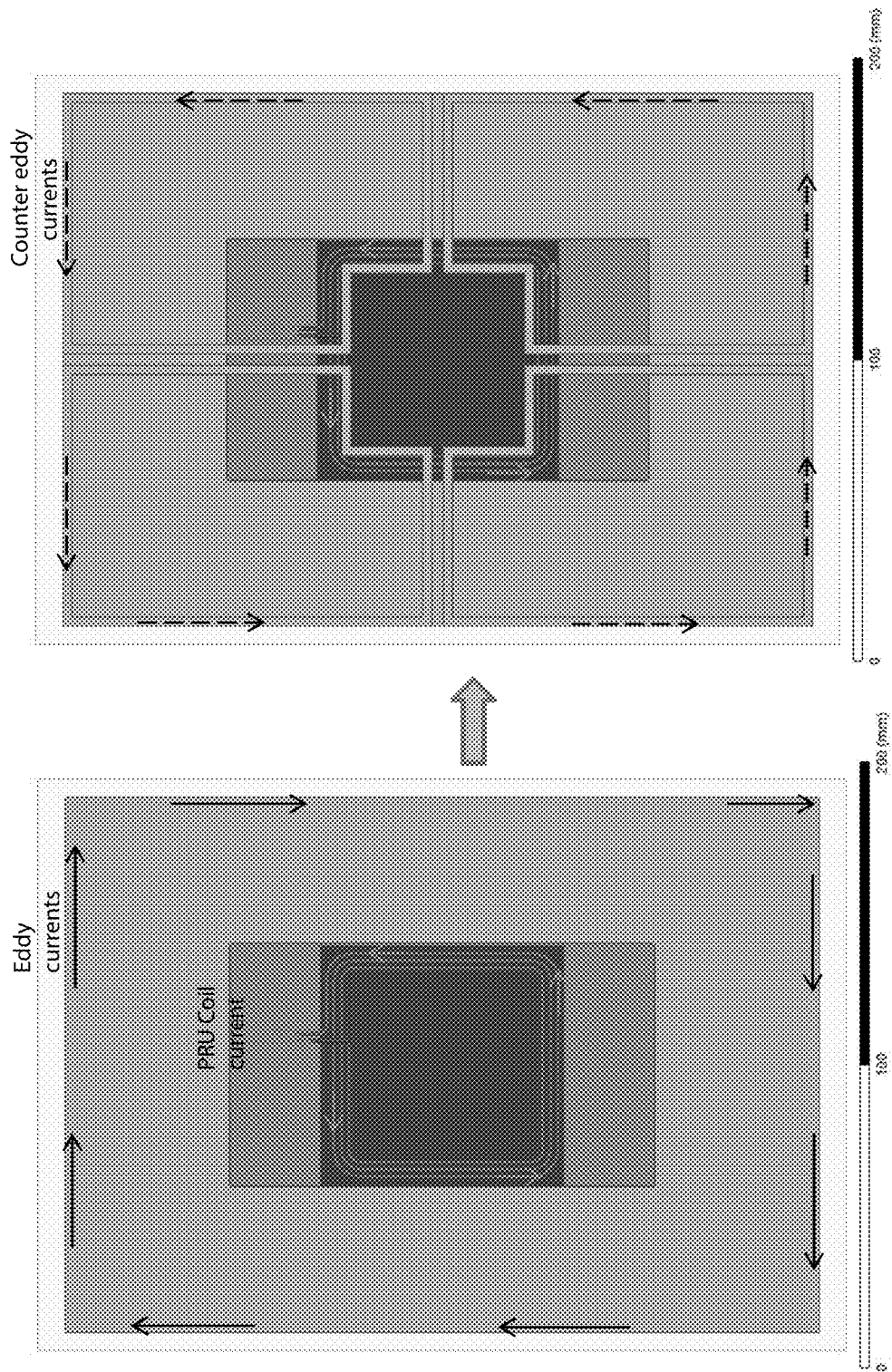
FIG. 15 shows comparison of relative current flow before and after adding the alternative embodiment of the disclosure as described in FIG. 14.

FIG. 15 illustrates an embodiment of the disclosure, as shown in FIG. 15, the frame acts similarly as the patterned conductive layer, where after adding the patterned conductive frames, it capture flux and reverses the eddy current to present to the coil to enhance coupling. For maximum flexibility, tablet and notebook wireless charging sleeves may be made based on the proposed solution which offers a scalable way of enabling existing tablets and notebooks to have A4WP based wireless charging function.

The disclosed embodiments are advantageous over the conventional systems, method and apparatus. For example, a known solution to the generated Eddy current is to provide a large piece of ferrite to cover the entire tablet/notebook such that the metal chassis/components are not exposed to the magnetic field generated by PTU coil. As a result, the coupling is uniform when PTU generates uniform magnetic field. However, the ferrite material is costly and the need for large area of ferrite in this solution renders the solution prohibitively expensive.

Another known solution is to introduce a slot or multiple slots on the metal plate behind the coil to prevent Eddy current generation. However, such modification may not be achievable as the chassis design requirements and internal component arrangement may prohibit any such cuts. By way of example, having a cut on the metal chassis of iPad will break the aesthetics of the product as well as adversely affect the product's structural integrity which thereby renders the solution not practical. Finally, the disclosed embodiments do not introduce significant bill of material or other transaction costs because the ferrite or coil size do not increase.

The proposed embodiments do not break the system design as it is an additive solution and does not require modification to existing systems. The disclosed embodiments also provide a versatile solution as for any tablet/notebook, regardless of construction/chassis material and the system integrator of the wireless charging PRU may directly apply the disclosed principles to the existing device to provide an improved wireless charging performance.

The following non-limiting and exemplary embodiments further illustrates certain embodiments of the disclosure. Example 1 is directed to a current offset device for use with a Power Receiving Unit (PRU), comprising: a coil loop having an outer loop and an inner loop; a conductive layer supporting an aperture, the aperture aligned with the inner coil loop; and a first slot formed in the conductive layer, the first slot extending from the aperture to an outside edge of the conductive layer.

Example 2 is directed to the current offset device of example 1, wherein the first slot is asymmetrically positioned with respect to the conductive layer.

Example 3 is directed to the current offset device of example 1, further comprising a second slot positioned symmetrically with respect to the first slot.

Example 4 is directed to the current offset device of example 1, comprising a plurality of slots positioned between the center opening and four edges of the conductive layer.

Example 5 is directed to the current offset device of example 1, wherein the conductive layer is substantially the same size as a surface of the PRU.

Example 6 is directed to the current offset device of example 1, wherein the aperture is concentrically aligned with the inner most coil loop of the PRU.

Example 7 is directed to a Power Receiving Unit (PRU) for charging a mobile device, comprising: a PRU Coil configured to receive a magnetic field; a metal plate covering the PRU coil; a conductive layer having a pattern thereon, the pattern configured to direct a plurality of Eddy currents accumulating on a first region of the PRU to a second region of the PRU.

Example 8 is directed to the PRU of example 7, wherein the first regions comprises a peripheral region of the PRU coil.

Example 9 is directed to the PRU of example 7, wherein the Eddy currents accumulating at the peripheral regions of the PRU coil are directed to central regions of the PRU.

Example 10 is directed to the PRU of example 7, wherein the conductive layer further comprises a pattern configured to direct the plurality of Eddy currents from the peripheral regions of the PRU to central regions of the PRU.

Example 11 is directed to the PRU of example 7, wherein the PRU coil and the conductive layer are concentrically positioned.

Example 12 is directed to the PRU of example 7, wherein redirecting the Eddy currents further comprises interposing a patterned conductive layer between the PRU coil and a power transmission unit (PTU).

Example 13 is directed to the PRU of example 7, wherein the pattern comprises an opening and a slot extending from the opening to an edge of the conductive layer.

Example 14 is directed to the PRU of example 7, wherein the conductive layer comprises a plurality of apertures and a plurality of slots.

Example 15 is directed to a method to provide a substantially uniform magnetic coupling for a power receiving unit (PRU), the method comprising: receiving a magnetic field at a coil associated with the PRU, the magnetic field creating a plurality of Eddy currents at a first region of the PRU; offsetting the Eddy currents by redirecting the Eddy currents from the first region of the PRU to a second region of the PRU.

Example 16 is directed to the method of example 15, wherein the first region comprises a peripheral region of the PRU coil.

Example 17 is directed to the method of example 15, wherein the Eddy currents accumulating at a periphery of the PRU coil are redirected to a central region of the coil.

Example 18 is directed to the method of example 15, wherein redirecting the Eddy currents further comprises using a conductive layer proximal to the coil.

Example 19 is directed to the method of example 15, wherein redirecting the Eddy currents further comprises positioning a conductive layer proximal to the PRU coil and a power transmission unit (PTU).

Example 20 is directed to the method of example 15, wherein redirecting the Eddy currents further comprises placing a patterned conductive layer proximal to the coil, the a patterned conductive layer having at least one opening and at least one slot to redirect the Eddy currents from a first region to a second region of the PRU.

While the principles of the disclosure have been illustrated in relation to the exemplary embodiments shown herein, the principles of the disclosure are not limited thereto and include any modification, variation or permutation thereof.

What is claimed is:

1. A current offset device for use with a Power Receiving Unit (PRU), comprising:
    a coil loop having an outer loop and an inner loop;
    a metal plate covering a first side of the coil loop;
    a conductive layer supporting an aperture, the aperture aligned substantially over the inner coil loop and positioned on a second side of the coil loop; and
    a first slot formed in the conductive layer, the first slot extending from the aperture to an outside edge of the conductive layer;
    wherein the conductive layer supporting an aperture is immediately adjacent the coil loop.

2. The current offset device of claim 1, wherein the first slot is asymmetrically positioned with respect to the conductive layer.

3. The current offset device of claim 1, further comprising a second slot positioned symmetrically with respect to the first slot.

4. The current offset device of claim 1, comprising a plurality of slots positioned between the center opening and four edges of the conductive layer.

5. The current offset device of claim 1, wherein the conductive layer is substantially the same size as a surface of the PRU.

6. The current offset device of claim 1, wherein the aperture is concentrically aligned with the inner most coil loop of the PRU.

7. A Power Receiving Unit (PRU) for charging a mobile device, comprising:
    a PRU Coil configured to receive a magnetic field, the PRU Coil further comprising an inner loop and an outer loop;
    a metal plate covering the PRU coil on a first side;
    a conductive layer having a pattern thereon, the pattern configured to direct a plurality of Eddy currents accumulating on a first region of the PRU to a second region of the PRU:
    wherein the conductive layer is immediately adjacent the coil loop and covers the coil loop on a second side, and wherein the conductive layer pattern comprises an opening positioned substantially over the inner loop of the PRU coil.

8. The PRU of claim 7, wherein the first regions comprises a peripheral region of the PRU coil.

9. The PRU of claim 7, wherein the Eddy currents accumulating at the peripheral regions of the PRU coil are directed to central regions of the PRU.

10. The PRU of claim 7, wherein the conductive layer further comprises a pattern configured to direct the plurality of Eddy currents from the peripheral regions of the PRU to central regions of the PRU.

11. The PRU of claim 7, wherein the PRU coil and the conductive layer are concentrically positioned.

12. The PRU of claim 7, wherein redirecting the Eddy currents further comprises interposing the patterned conductive layer between the PRU coil and a power transmission unit (PTU).

13. The PRU of claim 7, wherein the pattern further comprises a slot extending from the opening to an edge of the conductive layer.

14. The PRU of claim 7, wherein the conductive layer comprises a plurality of apertures and a plurality of slots.

15. A method to provide a substantially uniform magnetic coupling for a power receiving unit (PRU) having a metal plate covering the PRU, the method comprising:
    receiving a magnetic field at a coil associated with the PRU, the magnetic field creating a plurality of Eddy currents at a first region of the PRU, the coil having an inner loop and an outer loop;
    offsetting the Eddy currents by redirecting the Eddy currents from the first region of the PRU to a second region of the PRU;
    wherein the Eddy currents is redirected through a conductive layer having an aperture therein and wherein the aperture of the conductive layer is positioned over the inner loop of the coil.

16. The method of claim 15, wherein the first region comprises a peripheral region of the PRU coil.

17. The method of claim 15, wherein the Eddy currents accumulating at a periphery of the PRU coil are redirected to a central region of the coil.

18. The method of claim 15, wherein redirecting the Eddy currents further comprises using the conductive layer proximal to the coil.

19. The method of claim 15, wherein redirecting the Eddy currents further comprises placing the patterned conductive layer proximal to the coil, the a patterned conductive layer having at least one opening and at least one slot to redirect the Eddy currents from a first region to a second region of the PRU.

* * * * *